United States Patent [19]

Muhs

[11] 4,010,646
[45] Mar. 8, 1977

[54] BAROMETRIC NON-LINEAR ALTITUDE COMPENSATOR MEANS

[75] Inventor: Donald P. Muhs, Davenport, Iowa
[73] Assignee: The Bendix Corporation, South Bend, Ind.
[22] Filed: Dec. 15, 1975
[21] Appl. No.: 640,522
[52] U.S. Cl. ............................................... 73/387
[51] Int. Cl.² ......................................... G01L 7/12
[58] Field of Search ............ 73/386, 387, 384, 410; 74/393, 437

[56] References Cited
UNITED STATES PATENTS
2,552,377  5/1951  Jenny .................................. 73/387

*Primary Examiner*—Donald O. Woodiel
*Attorney, Agent, or Firm*—Leo H. McCormick, Jr.; William N. Antonis

[57] ABSTRACT

A correction mechanism for supplying an altimeter indicator with a rotational torque to compensate for the non-linear relationship between pressure altitude and barometric pressure. The correction mechanism has a first gear for receiving an input force and a second gear connected to the first gear. The second gear is eccentrically located on a shaft which connects a third gear with the altitude indicator. Because of the eccentricity of the second gear the line of action between the second gear and the first gear causes the shaft to rotate the third gear through a varying arcuate length for each tooth engagement.

9 Claims, 5 Drawing Figures

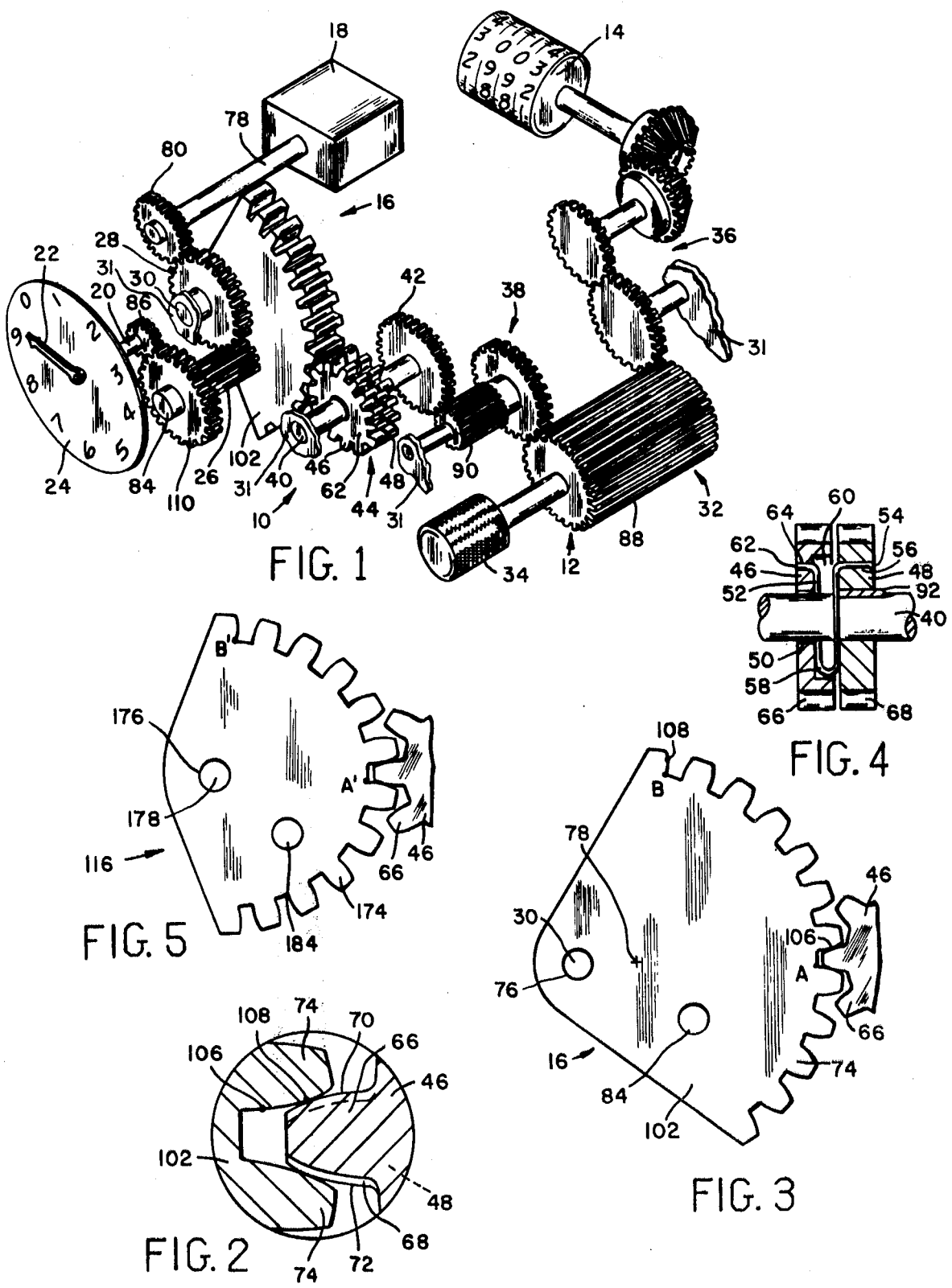

BAROMETRIC NON-LINEAR ALTITUDE COMPENSATOR MEANS

BACKGROUND OF THE INVENTION

Feet of altitude is a non-linear function of barometric pressure. If a linear differential is used to directly connect an aneroid to an indicator in an altimeter, an error of approximately 27 feet is built into the instrument in the operating range of from 28.10 to 31.00 inches of mercury. Therefore, a barometric pressure correction mechanism is required in order that an accurate indication is presented to an operator.

One method of correcting the output of the barometric pressure mechanism is to manually move an adjustable index on the altimeter dial to the feet of altitude corresponding to the ground level barometric pressure, thereby indicating ground level at the particular feet of altitude. In this method, the operator obtains information from an air data control station and thereafter makes the appropriate modification to the instrument through an input knob.

U.S. Pat. No. 3,218,862 discloses a correction apparatus. In this apparatus, the output of an aneroid is corrected by moving a helical gear set connected to an altitude indicator shaft through the engagement of a pin and driver gear connected to a helical gear associated with a cam surface. The cam surface engagement changes with changes in altitude to thereby provide the necessary correction for the altimeter display. However, such an arrangement employs many gears and is complicated.

SUMMARY OF THE INVENTION

I have devised a correction mechanism for use in an altimeter whereby a linear input is modified to produce a non-linear output which provides an indicator with a corrected altitude indication for changes in altitude pressure. The correction mechanism has a first gear means with teeth which engage teeth on a second gear means. The second gear means in a first embodiment has an axial opening which is eccentric to the teeth on the peripheral surface and in a second embodiment, the teeth form an elliptical peripheral surface. A shaft located in the axial opening carries a third gear which is connected to a pointer on an indicator dial. The teeth on the first gear are fully meshed with the teeth on the second gear means when the indicator dial and barometric display indicate ground elevation and 29.92 barometric pressure. Because of the eccentricity of the teeth on the second gear means as altitude changes are transmitted to the pointer, the angle of engagement between the teeth on the second gear means and the teeth on the first gear means change with each tooth engagement to provide a corrective rotation to modify rotative torque supplied to the pointer in order that the output of barometric pressure aneroid is actually equal to a measured altitude.

It is therefore the object of this invention to provide an altimeter with a correction mechanism in order to compensate for the non-linearity between barometric pressure altitude and actually measured altitude.

It is another object of this invention to provide an altimeter with a first gear means which engages an eccentrically positioned second gear means to produce a non-linear output from a linear input.

It is another object of this invention to provide a first gear with eccentric teeth on the peripheral surface and a second gear with teeth on its peripheral surface which engages the eccentric teeth with a resilient bias to assure that a modification in the output rotation from an input rotation caused by angle of engagement of the teeth is directly transmitted to a display without any lost motion.

It is a still further object of this invention to provide an altitude indicator means with an eccentric gear segment on which is carried an output gear for driving an indicator to a corrected altitude corresponding to a measured altitude from an input received from barometric pressure.

These and other objects will become apparent from reading this specification and viewing the drawings.

BRIEF DESCRIPTION OF THE DRAWING

FIG. 1 is a schematic illustration of an altimeter showing a correction mechanism for modifying barometric pressure altitude to display an altitude corresponding to a measured altitude for each particular barometric pressure.

FIG. 2 is a sectional view showing the engagement of the teeth on the gear segment and driver gear in FIG. 1 at a corrected position.

FIG. 3 is a sectional view of the teeth on the gear segment and the driver gear in a fully meshed position having the axial opening offset from the radial center of the teeth of the gear segment.

FIG. 4 is a sectional view of a resilient means attached to a driver spur gear for biasing the teeth on a driven spur gear into engagement with the sector gear.

FIG. 5 is a sectional view of the teeth on the gear segment and the driver gear in a fully meshed position when the teeth on the gear segment forms an elliptical peripheral surface.

DETAILED DESCRIPTION OF THE PREFERRED EMBODIMENT

The correction mechanism 10 for use in an altimeter has a driver gear means 12 connected to a display 14 and to a second or sector gear means 16 through which the output from an air data computer or aneroid 18 is transmitted to a drive shaft 20 for moving a pointer 22 over a dial 24. The output from the aneroid 18 is modified through the relationship of the engagement of the teeth on the sector gear means 16 and the first gear means 12 to shift the arcuate position of the pinion gear 26 with respect to gear 28 on shaft 30. The shaft 30 is fixed to the housing 31 of the altimeter.

The driver gear means 12 includes a gear train 32 through which an operator input is simultaneously transmitted from knob 34 through reduction gears 36 to the display 14 and through reduction gear 38 to a first shaft 40. The shaft 40 is fixed to the housing 31 at a set distance from shaft 30. Gear 42 is fixed to the shaft 40 and rotates the same to provide the first gear means 44 with rotative torque. The first gear means 44 has a first spur gear 46 and a second spur gear 48 located on shaft 40. As best seen in FIG. 4, the second spur gear 48 is fixed to the shaft 40 while the first spur gear 46 has an axial opening 50 which is free to rotate on the shaft 40. A spring or resilient means 52 has a first end 54 fixed in an opening 56 in the second spur gear 48, a coil 58 located in a chamber or bore 60 in the first spur gear 46, and a second end 62 fixed in an opening 64 in the first spur gear 46. The teeth 66 on the first spur gear 46 and the teeth 68 on the second spur gear 48 are identical in width and pitch. Spring 52 biases the front face 70 on the first teeth 66 and the rear face 72 on the second teeth 68 against teeth 74 on the sector gear means 16, in a manner as best seen in FIG. 2.

The sector gear means 16, in FIG. 3, has a central opening 76 which is offset from the axial center O, identified by numeral 78, by a distance equal to $x$. The eccentricity of each tooth 74 on the peripheral surface of the sector gear will vary as a function which approaches the square of the offset distance $x$ multiplied by a tangent of the angle of rotation. Thus, for each tooth increment, the rotation of the shaft 30 will vary as a function of tooth width plus an additional distance equal to the addendum times the tangent of the angle associated with the angle of rotation.

Each tooth 74 on the sector gear means 16 is of equal width and the tooth space is the same such that the radius OA is equal to OB. However, because of the offset $x$, the angle of rotation experienced by the shaft 30 varies with each tooth engagement.

The sector gear means 116, shown in FIG. 5, has an axial opening 176 which is located at the center O', indentified by numeral 178, of an ellipse having an equation equal to $(x^2/a) + (y^2/b) = 1$ where $x =$ the major axis, and $y =$ the minor axis. Each tooth 174 has a radii from the axial opening 176 which varies from the preceding tooth. Thus, the teeth on peripheral surface follows an elliptical curve which causes the engagement of the teeth on the sector gear 116 to vary in a manner such that a complete mesh occurs when the gears are engaged along the major axis O' A' and tangentially engaged, as shown in FIG. 2, when meshed along the minor axis O' B'. Because of the change in the mesh angle or line of action, the shaft 184 moves in an arc around the axial shaft 178 at a different rate with each tooth engagement.

MODE OF OPERATION OF THE PREFERRED EMBODIMENT

When an aircraft equipped with an altimeter having a correction mechanism 10 is flying at an altitude, the aneroid 18 supplies shaft 78 with a torque which rotates driver gear 80. Driver gear 80 in turn rotates gear 28 located on shaft 30. Gear 28 is connected to pinion 26 which rotates on shaft 84 to provide gear 86 and indicator shaft 20 with a rotative torque to move the pointer 22 over dial 24 and provide the operator with an indication of altitude.

When the pilot approaches an airport and desires to land, ground control is contacted and the barometric pressure present at that particular location is transmitted to the aircraft. The pilot moves knob 34 to display the ground barometric pressure either above or below 29.92 in display 14. As knob 34 moves gear 88, gear train 38 rotates pinion 90 to rotate gear 42 on the first shaft 40. As shaft 40 rotates, this same rotation is transmitted into the first spur gear 48 through the resilient means 50 attached to the second spur gear 48 which is fixed to the shaft 40 by pin 92.

As spur gear 46 is rotated by the resilient linkage of spring 52 from the full mesh position as shown in FIG. 3 to a corrective position as indicated by FIG. 2, teeth 66 and teeth 68 separates by an arcuate length which provides a correction to compensate for the non-linearity between barometric pressure altitude and actual altitude. As the sector gear 102 is rotated about shaft 30, the pinion gear 26 walks around gear 28 which is held stationary by gear 80. As the pinion 26 walks around gear 28, gear 110 provides gear 86 with a rotational correction which moves a pointer 22 to a position such that indicated altitude presented by aneroid 18 is substantially equal measure altitude.

With each and every tooth engagement between teeth 66 on spur gear 46 and teeth 74 on sector gear 102, the line of action and pressure angle changes from a point 106 where full meshing of the gears occur to a point 108 where the maximum corrections occur. Thus, I have provided a means to modify a linear angular rotational input from gear 88 to a non-linear angular rotational output by the time pinion 26 is moved around the stationary gear 28.

I claim:
1. A barometric pressure correction mechanism for providing an altimeter indicating means with a rotative torque to compensate for the non-linear relationship between barometric pressure and pressure altitude, said correction mechanism comprising:

a housing;

first shaft means fixed in said housing and responsive to rotative input torque;

first gear means located on said first shaft means having a first plurality of teeth thereon, each of said first plurality of teeth having a corresponding uniform thickness and pitch;

second gear means having a second plurality of teeth thereon each of which has a uniform thickness and pitch, said second gear means having a central opening eccentric to said axial center of the peripheral surface of said second plurality of teeth;

second shaft means fixed in said housing and extending through said central opening of the second gear means for aligning said second plurality of teeth with said first plurality of teeth on the first gear means;

third gear means located on said second gear means, said third gear means having a third plurality of teeth thereon which drive a pointer associated with the indicator means to provide the altimeter indicating means with an operational input, said eccentric central opening in the second gear means causing the pressure angle of engagement between said first teeth and said second teeth to continually change during rotation whereby said second gear means rotates through an arcuate length for each tooth engagement equal to the tooth space plus a function of the acruate length modified by the eccentricity of the opening in the second gear means with respect to each tooth to provide the third gear means with a non-linear rotational torque;

fourth gear means secured to said first shaft having a fourth plurality of teeth thereon with a uniform thickness and pitch identical to said first plurality of teeth on the first gear means; and a spring connecting the first gear means with the fourth gear means to bias a tooth on the first plurality of teeth and a tooth on the fourth plurality of teeth into continual engagement with a tooth on the second plurality of teeth.

2. The correction means, as recited in claim 1, wherein said eccentricity of the central opening only permits the central tooth of said second teeth on the second gear means to be fully engaged within the tooth space of the first teeth on the first gear means.

3. The correction means, as recited in claim 2, wherein said line of action between said first teeth and said second teeth varies as a function of both the pitch of the teeth and the eccentricity of the central opening.

4. The barometric pressure correction mechanism, as recited in claim 1, wherein the central tooth on said second gear means is fully engaged with a tooth on the first gear means when barometric pressure is equal to 29.92 inches of mercury.

5. The barometric pressure correction mechanism, as recited in claim 4, wherein said eccentricity of said central opening is selected to compensate for discrepancy in indicated altitude and actual altitude both above and below barometric pressure of 29.92 inches of mercury.

6. The barometric pressure correction mechanism, as recited in claim 1, wherein said central opening is offset from the axial opening such that the maximum engagement of a tooth of the teeth on the said second gear means occurs when the maximum correction is supplied to the altimeter indicating means.

7. A barometric pressure correction mechanism for providing an altimeter indicating means with a rotative torque to compensate for the non-linear relationship between barometric pressure and pressure altitude, said correction mechanism comprising:

a housing;

first shaft means fixed in said housing and responsive to a rotative input torque;

first gear means located on said first shaft means having a first plurality of teeth thereon, each of said first plurality of teeth having a corresponding uniform thickness and pitch;

second gear means having a second plurality of teeth thereon each of which has a uniform thickness and pitch, said second gear means having an axial opening with a radial component to peripheral surface which varies with each tooth of said second plurality of teeth;

second shaft means fixed in said housing and extending through said axial opening of the second gear means for aligning said second plurality of teeth with said first plurality of teeth on the first gear means;

third gear means located on said second gear means, said third gear means having a third plurality of teeth thereon for providing a pointer of the altimeter with an operational input, said peripheral surface on the second gear means causing the pressure angle of engagement between said first teeth and said second teeth to continually change during rotation whereby said second gear means rotates through an arcuate length for each tooth engagement equal to the tooth space plus a function of the arcuate length modified by the eccentricity of the axial opening in the second gear means with respect to each tooth to provide the third gear means with a non-linear rotational torque, and spur gear means secured to said first shaft having a fourth plurality of teeth thereon with a uniform thickness and pitch identical to said first plurality of teeth on the first gear means; and a spring connected to the first gear means with the spur gear means to bias a tooth of the first plurality of teeth and a tooth on the fourth plurality of teeth into continued engagement with a tooth on the second plurality of teeth.

8. A barometric pressure correction mechanism as recited in claim 7 wherein said correction mechanism further includes:

fourth gear means located on said second shaft means and connected to said third gear means, said fourth gear means imparting a rotative torque to said third gear means to provide said altimeter indicating means with a signal corresponding to a barometric pressure, said fourth gear means remaining stationary as said second gear means moves to allow said third gear means to supply said altimeter indicating means with an independent rotative torque.

9. The barometric pressure correction mechanism, as recited in claim 7, wherein the central tooth on said second gear means is fully engaged with a tooth on the first gear means when barometric pressure is equal to 29.92 inches of mercury.

* * * * *